June 27, 1939.   C. PREHODA   2,163,964
CORE MAKING MACHINE
Filed Aug. 16, 1937   3 Sheets-Sheet 1

INVENTOR.
Coleman Prehoda.
BY Woodling and Krost
ATTORNEY.

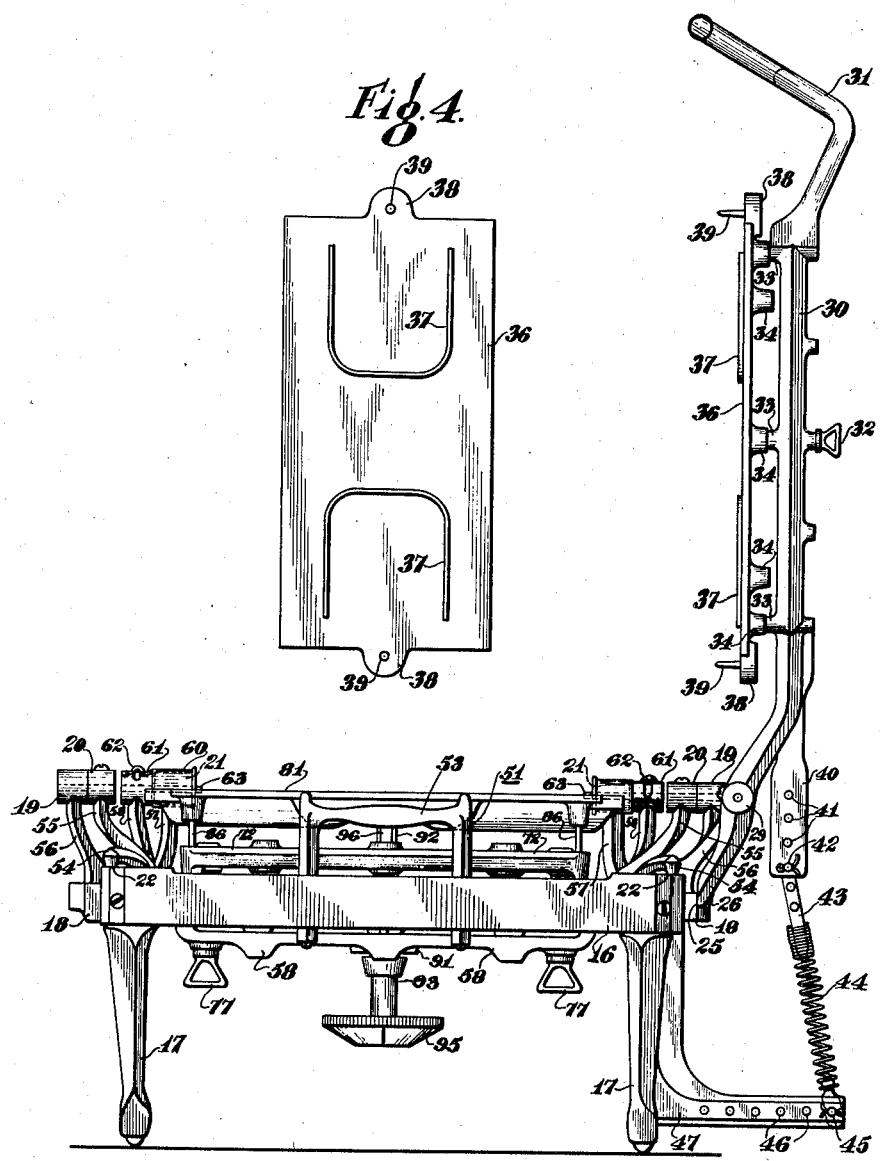

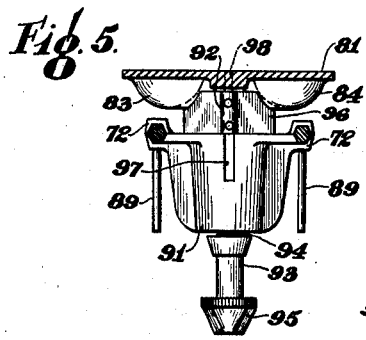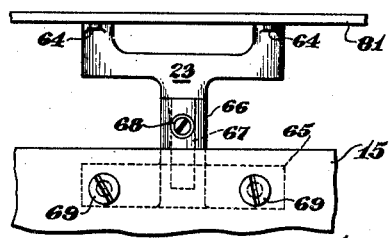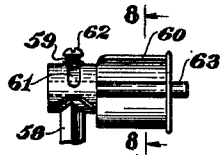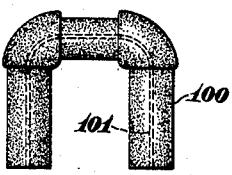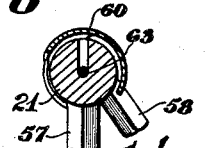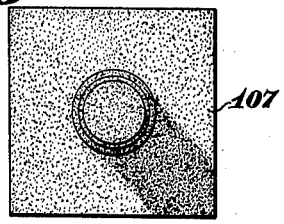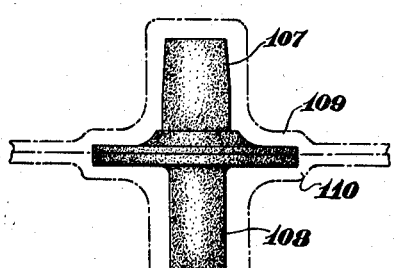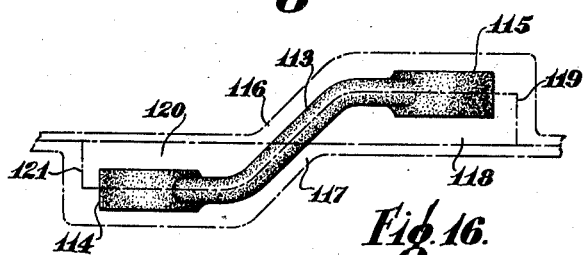

Patented June 27, 1939

2,163,964

UNITED STATES PATENT OFFICE 2,163,964

CORE MAKING MACHINE

Coleman Prehoda, Cleveland, Ohio

Application August 16, 1937, Serial No. 159,228

5 Claims. (Cl. 22—10)

My invention relates to core making machines, and more particularly to core making machines utilizing a plurality of core plates.

An object of my invention is to provide a machine for making cores out of core material between mating core plates.

Another object is to provide a machine for making cores in the cavity formed in a core plate.

Another object is to provide an apparatus for placing complementary core plates in proper mating position.

Another object is to provide apparatus for pivotally swinging one core plate in respect to another core plate upon the apparatus to insure proper mating of the core plates.

Another object of my invention is to provide a machine for pivotally swinging one core plate in respect to another core plate so that the mating surfaces of the core plates face each other, and for moving one of the core plates away from the other core plate in a direction vertical to a plane passing through the mating surface of one core plate.

Another object of my invention is to provide a machine for giving a compound movement of one core plate in respect to another core plate.

Another object is to provide a machine for raising one core plate in respect to another core plate before swinging the one core plate away from said other core plate so that the core formed between is not broken.

Another object is to provide a pivoted mounting for core plates upon a core machine which are free to swing into proper position.

Another object is to provide guards for the pivoted mountings of a core machine so that the core material does not enter the pivoted mounting to obstruct its operation.

Another object is to provide rests for a relatively unstable core plate mounted upon a core making machine.

A still further object is to provide a core making machine having a plurality of frame members mounted thereon and adapted to carry core plates through the successive stages of making various types of cores.

A still further object is to provide a carrier for removing the core from the core machine and placing it upon a drier plate.

Other objects and a fuller understanding of my invention may be had by referring to the following description and claims, taken in combination with the accompanying drawings in which:

Figure 3 is an end view of the core making machine shown in Figure 1, and shows the mounting of one of the lower frame members and the back frame member.

Figure 4 is a view showing the face of the back core plate mounted on the back frame member in vertical position in Figure 3.

Figure 5 is a detailed view of the mounting of the core plate to a frame member and illustrates the means of vertically raising and lowering the core plate relative to the frame member, and is taken along the line 5—5 of Figure 2.

Figure 6 is a detailed view showing the construction of the bracing member, or rest, for supporting the relatively unstable core plate.

Figure 7 is a detailed view of the pivotal mounting of a frame member and the guard member for the pivotal mounting.

Figure 8 is a cross-sectional view taken through the line 8—8 of Figure 7.

Figure 9 illustrates the finished core made with the core plates shown in Figures 1, 2, 3 and 4.

Figure 10 is a cross-sectional view of the core shown in Figure 9 and shows the mating surfaces of the core plates used in making the same.

Figure 11 is a plan view of another type of core made with other core plates mounted to my machine.

Figure 12 is a view of the core shown in Figure 11 and shows the bottom core plate used in making the core.

Figure 13 is a plan view looking down on another type of core made by utilizing other core plates on my machine.

Figure 14 is a cross-sectional view showing the mating surfaces of the core plates used in making the core illustrated in Figure 13, and shows a side view of the core.

Figure 15 is a plan view looking down upon another type of core made by utilizing other types of core plates on my machine.

Figure 16 is a cross-sectional view showing the mating surfaces of the core plates used in making the core shown in Figure 15, and shows a side view of the core.

Figure 1:
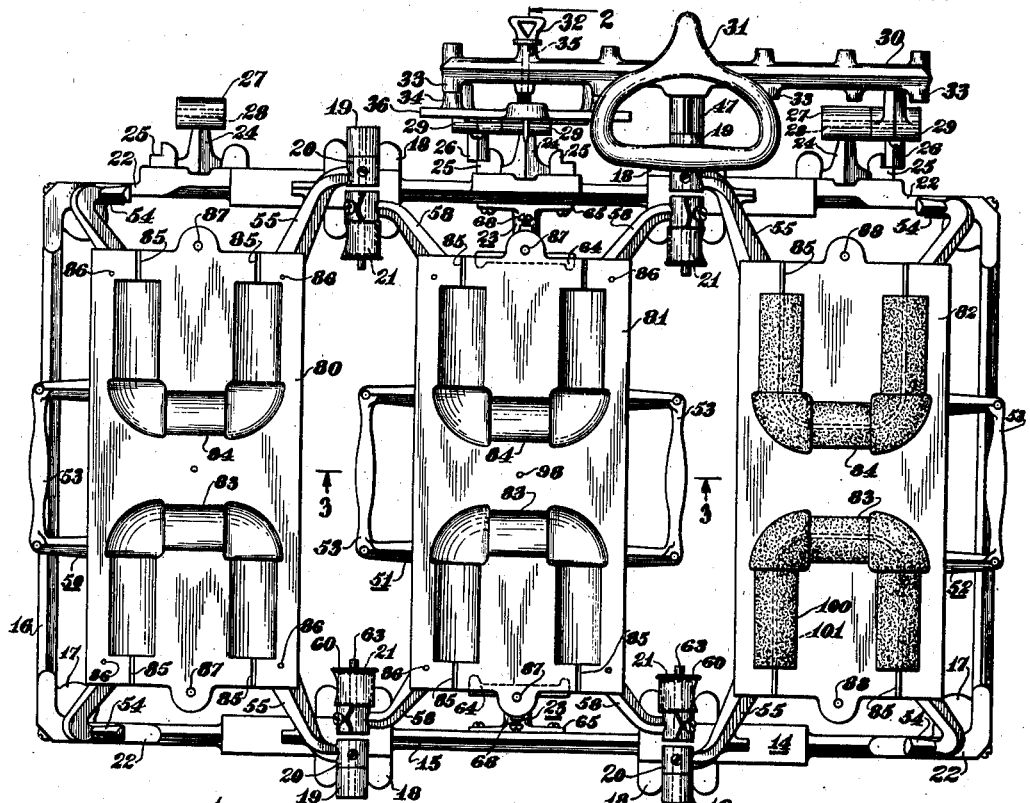
Figure 1 is a a plan view looking down upon my core making machine with the core plates in open position.

With reference to Figure 1, I show the plan view of my core making machine which comprises, generally, a standard 14, three frame members 50, 51 and 52, and a back frame member 30. The standard, denoted generally by the reference character 14, is composed of two longitudinal sides 15 and two lateral sides 16. The sides 15 and 16 are joined together by suitable means to form a rectangular frame, and are mounted upon four legs 17. Mounted to the two sides 15 are the bearing supports 18. These bearing supports 18 carry the pivoted mountings upon which the three lower frame members are carried.

The end frame members 50 and 52 are pivotally mounted to the bearings 19, which in turn are supported on the supporting legs 56 secured to the bearing supports 18. These bearings 19 have openings extending therethrough laterally of the standard, and the pivot bearings 20 are pivotally mounted thereto so that the pivoted mountings 20 rotate relative to the bearings 19. A flat portion 22 is provided upon the standard and provides rests upon which the two end frame members rest. The end frame members 50 and 52 have supporting legs 54 which rest upon the rest portions 22. The supporting legs 55 of the end frame members are connected to the pivoted bearings 20 and are supported thereby. It is, therefore, seen that the end frame members 50 and 52 are pivotaly mounted on one side and rest by weight of gravity upon the standard on their free side. Each of the end frame members are, therefore, normally resting flat as shown in Figure 1, but may be pivotally swung in toward the center frame member 51.

The center frame member is pivotally mounted upon both of the sides to the standard. The supporting legs 57, carried by the bearing supports 18, have the bearings 21 located upon their ends. The bearings 21 have pivotally mounted thereto the pivot pins 63, as is better illustrated in Figures 7 and 8. The pivot pins 63 in turn are carried upon the pivot members 61 which support the supporting legs 58 which carry and support the center frame member 51. Each leg 58 consists of an integral metal member formed into the shape shown in Figure 2 with the two end portions bent upwardly and the intermediate portion disposed horizontally. The legs 58 of the center frame member 51 are not as long as the supporting legs 55 of the end frame members 50 and 52 and, therefore, the pivoted mountings of the end frame members and the side pivoted mountings of the center frame member are in alignment so as to be mounted upon one point of pivot, as is readily seen in the view shown in Figure 1.

Figure 2:
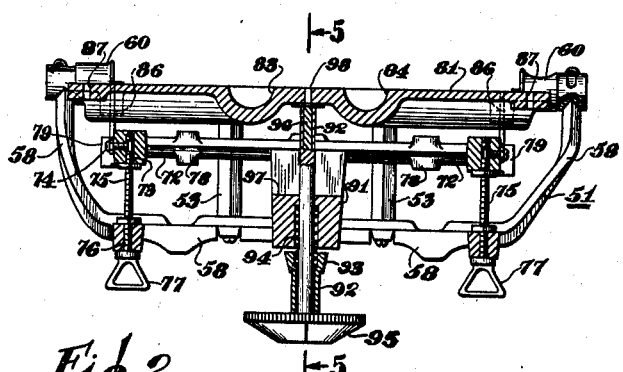
Figure 2 is a cross-sectional view of the center frame member and core plate shown in Figure 1, and is taken along the line 2—2 of Figure 1.

Referring to Figures 7 and 8 taken in conjunction with the views shown in Figures 1 and 2, it is seen that the pivoted mountings of the center frame member are detachable in that the pivot pins 63 may be raised up out of the slots formed in the bearings 21. Therefore, the center frame member 51 may be pivoted on the bearings on one side by lifting the pivoted bearings out of connection on the other side. Since it is necessary to have an open slot in the bearing 21 so that one side or the other of the center frame member 51 may be raised, it is found necessary to guard the bearing against loose core material used in making the cores. To prevent fouling of the pivoted mountings I have provided guards 60 which fit over and keep the slots and the bearings 21 covered. These guards 60 are semi-cylindrical in shape and are carried upon the pivot members 61, but are free to slide over the bearings 21. Since free movement of the frame member would be prevented by the guard 60 being rigidly secured to the pivot members 61 I have provided for a limited movement of the guard members 60 upon the pivot members 61. This has been done by cutting a slit in the guard members 60 and securing the guard members 60 to the pivot members 61 by means of the screws 62 which have very small coil springs, or washers, 59 frictionally engaging the guard members 60. Therefore, the guard members 60 rotate with the pivot members 61 until the arms 57 engage the edges of the guard members 60 and prevent further rotation and thereupon the guard members 60 rotate upon the pivot members 61 to the extent permitted by the screws 62 in the slits through which the set screws 62 move. It is seen through the various views of the pivot mountings and the guard members, that free movement of the center frame member 51 is insured to prevent a 180° pivoted movement, and at the same time the slots in the pivoted mountings are covered to protect them against loose core material.

Each of the frame members has handles 53 extending from its sides, the end frame members having one handle each, and the center frame member having two handles 53.

The center frame member is relatively unstable and may require additional support when downward pressure is exerted thereon, and for this purpose I have provided bracing members denoted generally by the reference character 23, which are secured on the longitudinal sides 15 of the standard. The detailed construction of the bracing members 23 is better illustrated in Figure 6, which shows the supporting rests 64 engaging the bottom of the center core plate 81. The lower part 65 of the bracing members 23 are secured at the sides 15 by means of the bolts 69. The bracing members 23 are adjustable to provide different positions for the rest supports 64, and for this purpose the socket 66 slidably accommodates the projection 67, and these are set at proper relative positions and secured together rigidly by the set screw 68. The projection 67 fits within the socket 66 and is braced thereby. Therefore, the bracing support 23 is adjustable as to height.

Detachably mounted by bolts or other suitable means to the standard, are the supports 24 which are located along the back of one side member 15. These supports 24 carry the bearings 27 through which the bearing openings 28 extend. The two pivoted bearings 29 are pivotally secured to the bearings 27 and rotate relative thereto. The back frame member 30 is secured to the two pivot bearings 29. The bearings 29 are disposed to permit the back frame member 30 to be pivoted up and down relative to the standard. To prevent the back frame member from moving any further back than the position shown in Figure 3, I provide stops 25 which engage the extensions 26 extending from the back frame member 30. With particular reference to Figure 3 it is seen that the back frame member 30, therefore, may be moved as far back as the position shown in Figure 3, and is free to be moved downwardly toward the laterally disposed frame members. The handle 31 is provided on the end of the back frame member 30 to provide means for raising and lowering the same.

A back core plate 36 is carried upon the back frame member 30 and is secured thereto by means of the screw member 32. There are a plurality of engaging projections 33 extending from the back frame member 30, and these in turn engage the engaging portions 34 on the back core plate 36.

The threaded portion 35 of the screw bolt 32 is shown in the view of Figure 1, and shows the screw bolt 32 engaging the back core plate 36. There are projections or ears 38 extending from the ends of the back core plate 36, and disposed outwardly from the face of the core plate 36 are the two pins 39 as is illustrated in Figure 4, which shows the face of the core plate 36. A raised portion, or projection, 37 is disposed upon the face of the core plate 36 on each half thereof. These projections 37 are shaped to form indentations or impressions in core material being formed into cores.

In order that the back frame member is simple to operate, and to provide means for supporting part of its weight, I provide a spring arrangement, a side view of which is shown in Figure 3. A tail end 40 of the back frame member 30 has a plurality of openings 41 provided therein. The spring attachment 43 is secured through one of the openings 41 by means of the pin bearing 42, which spring attachment 43 is connected to the long coil spring 4. An arm member 47 is secured to the back of the standard by bolts, or other suitable means, and extends backwardly therefrom as shown in Figure 3. This arm member 47 has a plurality of openings 46 through one of which is secured the pin bearing 48, which anchors the lower end of the coil spring 44 to the arm member 47. It is seen that the relative tension of the spring 44 may be varied by shifting the position of the pin bearings 42 and 45. In this manner the weight of the back frame member 30, and back core plate 36 attached thereto, may be compensated for by the tension of the spring 44. Therefore, the operation of the back frame member by raising and lowering the handle 31 may be suitably adjusted by adjusting the tension of the spring 44. When an impression is to be made upon a core being formed the back core plate 36 is lowered by pulling down on the handle 31, and when not in operation the handle 31 is raised up to the position shown in Figure 3. It is seen in Figure 1 that there is an additional bearing 27 on the left side of the standard. Therefore, the back frame member may be detached from the two bearings 27 in the middle and the right side of the standard, and the whole back frame member 30 shifted over so as to be carried on the left side of the standard, and so that the back core plate may be mounted over either the left hand frame member 50 or over the center frame member 51. It is also to be noted that the core plate 36 may be shifted upon the back frame member 30 so as to be placed on the right side of the frame member 30, or on the left side of the frame member 30, which is the position shown in Figure 1. By this means a plurality of operating positions of the back core plate 36 may be obtained.

The detailed construction of the lower frame members and of the attachment of the core plates is illustrated in Figure 2, which by way of example shows the construction of the center frame member 51 and the mounting of the core plate 81 thereto. Frame member 51 is double, in that it has the lower frame composed of legs 58 and the upper frame composed of members 72 spaced at a distance from the lower frame. The upper frame is positioned at a pre-determined distance from the lower frame by means of the screw bolts 75, which are anchored at their ends to the bearings 79 of the members 72 of the upper frame, and secured thereto by means of the set screws 74. The upper ends of the screw bolts are free to rotate within the openings 73 in the bearings 79, but are prevented from being withdrawn by the set screws 74. The lower end of the screw bolts 75 are threadably engaged to the threaded bearings 76 mounted to the legs 58 of the lower frame. Therefore, by turning the handle 77 of the screw bolts 75 the distance between the upper frame from the lower frame is varied. The determined distance may be fixed by setting jam nuts on the screw bolts 75 against the adjacent bearings. Extra pin bearings 78 are provided in the members 72 which are utilized for mounting other upper frames to the lower frame when differently shaped core plates are used requiring the different upper frame. Figure 5, being a view taken along the line 5—5 of Figure 2, also illustrates the manner of mounting the frame members together. Since the screw bolts 75 are at opposite ends of the upper frame there is some tendency of upper frame to tilt with respect to the lower frame. To act as a guide, and to prevent tilting, I provide longitudinal pins 89 which are attached to the members 72 of the upper frame which by reason of their sliding engagement with the lower frame hold the two frames in substantially parallel arrangement. The lower ends of the handle 53 are mounted by screws to the legs 58 of the lower frame as is shown in Figure 2, the upper ends of the handles not being shown.

The core plate 81, which in the illustration of Figure 2 is the center core plate of Figure 1, is carried upon the frame member 51. The frame members 50, 51 and 52 are substantially the same, and each have double frames as illustrated in Figure 2, the difference in the frame members being in respect to the pivotal mountings and the length of the supporting legs attached to the pivotal mountings. In the arrangement shown in Figure 1, core plate 80 is attached to frame member 50 in the same manner as core plate 81 is attached to frame member 51. In this arrangement core plate 82 rests loose upon frame member 52 but frame member 52 is adapted to attach a core plate when a rearrangement calls for an attached core plate there.

There is a depression 83 and a depression 84 formed in each core plate which depressions conform to the outline of the cores being formed. The vent depressions 85 are formed in the surface of the core plates at the ends of the depressions 83 and 84 for aiding in providing open vents in the cores to be formed.

As is seen in Figures 2 and 5, the upper frame has formed thereon and connected thereto a housing 91, which extends downwardly from the members 72 of the upper frame. The housing 91 has a round opening extending throughout its length, and a piston plunger 92 extends therethrough. A small riveted pin 98 is secured to the core plate 81 so as to permit turning of the plunger relative to the core plate and in this manner the piston plunger 92 is firmly secured to the core plate 81 but rotatable thereto. A coil spring 94 is placed within an enlargement of the opening in the housing 91 and surrounds the piston plunger 92. One end of the coil spring 94 bears against the housing 91 and the other end bears against a washer member 93, which is slidably carried upon the outer end of the piston plunger 92. The handle 95 extends laterally across the end of the piston plunger 92 and is fastened thereto. The tension of the coil spring 94 is such that its expansion causes the washer member 93 to press the handle 95 outwardly, and thus to draw the piston plunger 92 downwardly in the view shown in Figure 2.

Instead of the spring and mechanical means for moving the core plate relative to the frame member as shown in Figure 5, compressed air or other fluid may be utilized for operating the vertical movement of the core plate. In such an arrangement, the piston plunger is secured to the core plate and the piston cylinder in which the piston plunger fits is secured to the upper frame member. The expansion of the compressed air causes the piston and cylinder to move apart. The position of the plunger and cylinder may be reversed for the same effect by mounting the piston plunger to the upper frame and the piston cylinder to the core plate.

There is a cross piece 96 mounted transversely of the piston plunger 92. The cross piece 96 is shown in cross-sectional view in Figure 2, and is shown by side view in Figure 5. It is seen in Figure 5 that there is a slot 97 cut through the housing 91. The mounting of the piston plunger 92 to the core plate 81 is such that the piston plunger 92 may be rotated thereon. By rotating piston plunger 92 so that the cross piece 96 is in alignment with the slot 97 the cross piece 96 will fall down into the slot 97 by reason of the action of the coil spring 94. The movement of the cross piece 96 through the slot 97 pulls the core plate 81 down close to the upper frame. When it is desired to raise the core plate 81 in respect to the upper frame the handle 95 is pressed so as to overcome the action of the coil spring 94, and the plunger 92 is rotated so that it rests upon the top of the housing 91 outside of the slot 97. Therefore, two fixed positions of the core plate 81 are obtainable by operation of the handle 95 attached to the plunger 92. To guide the up and down movement of the core plate 81 I provide pins 86, which are connected to the core plate 81, and which slidably engage in openings provided in the members 72 of the upper frame. It is to be noted that only the plates 80 and 81 are provided with pins 86 as the drier plate 82 merely rests upon the frame member 52 and is not mounted thereto. Although the core plate 82 is not secured to the frame member 52, as described and shown in Figure 2, the structure of frame member 52 is substantially the same as that shown in Figure 2 so that other arrangements may be adopted, such as when a drier plate is to be placed upon the left side of the machine rather than upon the right side as illustrated in Figure 1. The core plates 80 and 81 have openings 87 provided in extended ears at the ends thereof. The drier plate 82 has pins 88, also disposed in projecting ears, which are disposed to mate with the openings 87 in the core plates 80 and 81 when core plate 82 is in mating position with either of the other core plates.

The operation of my core making machine is such that cores of various types may be made thereon. In Figures 1, 2 and 3 I illustrate my machine using core plates adapted to form a two-way core, which in this instance produces cores of a pipe shape. As illustrative of the method used to make two-way cores with my machine, the following process is described. With my core making machine in the open position shown in Figures 1 and 3 the back frame 39 is standing vertical and the core plates 80 and 81 are resting flat and in alignment with each other. The drier core plate 82, which is unattached, is resting upon the right hand frame member 52. Core material of suitable substance, such as sand and linseed oil, is spread on the top of the core plates 80 and 81 so as to fill the depressions 83 and 84. When it is desired to form an internal vent in the core to be formed, the back core plate 36, having a raised projection 37, is brought downwardly to impress the vent recess in the core material on core plate 81. To insure keeping the vents thereby formed open, that is, without having the ends of the vents closed by the core material, some round pieces of wood are laid in the vent depressions 85 so as to extend slightly into the cores. By this means no core material may fill up the ends of the vents formed in the cores. The vent depressions 85 in the core plate 80 are such as to fit over the round pieces of wood and to mate therewith. After the excess core material has been scraped off of the core plates 80 and 81, and the vents formed therein, by bringing down the core plate 36, the core plates 80 and 81 are brought together by lifting the handle 53 of the frame member 50, and the right hand handle 53 of the frame member 51. In this way the core plates 80 and 81 meet in a mating position vertically of the standard. When formed in this way the two-way core may be made with a minimum chance of breakage of the core as the surfaces and corresponding depressions mate perfectly due to the pivoted mountings supporting the frame members to which the core plates are attached. After being thus pressed together, both core plates are swung over so that core plate 80 rests upon and over core plate 81, that is, in the center of the standard.

In the case of a shallow core, the core plate 80 may be immediately swung back into its original position leaving the core resting upon the core plate 81. However, if the core is very deep, or has straight walls, the swinging of the core plate 80 back upon its pivotal mounting may break off a portion of the core. To obviate this the core plate 80 may first be raised vertically upward from the core plate 81 by operating the handle 95. The core plate 80 is raised a short distance vertically upwardly by turning the handle 94 until the cross piece 96 slides into the slot 97, which pulls the core plate 80 toward the upper frame of the frame member 50 to which it is attached in the same manner as was described in the construction shown in Figure 2. After the core plate which is resting on top, which in this instance is core plate 80, is raised a short distance vertically upwardly then it is pivotally swung back into the original position shown in Figure 1. Before operating again the core plate is adjusted back into its position by manipulation of the handle 95 so as to pull the cross piece 96 out of the slot 97, and so that the core plates 80 and 81 are in straight alignment with each other.

Since the core plate is mounted substantially at its center upon the piston plunger 92 with only pins 86 acting as a sliding guide it is relatively unstable. When the back core plate 36 is brought downwardly to form vents in the core the pressure causes some instability of the lower core plate. However, the bracing supports 23 engage the ends of the lower core plate as previously described and brace it against tilting or other movement.

At this stage of the process a core has been formed upon the center core plate 81, and it is necessary to place it upon a drier plate for transportation to the oven or drying rack. Drier plates 82 are provided for the purpose of carrying the formed cores from the core making machine. The loose core plate 82 is turned over manually so that the mating surfaces, that is the surfaces having the depressions formed therein, face core plate 81. The core plate 82 is placed down upon the core plate 81 so that the pins 88 are inserted through the openings 87 to insure an accurate mating of the mating surfaces. The frame member 52, which normally has no plate engaged thereto, is then pivotally swung upon its pivoted mounting so as to be over the frame member 51. By holding the two frame members 52 and 51 together, and pivotally swinging both frame members 52 and 51 to the right, that is so that core plate 82 is on the bottom and core plate 81 is on top, then the core has been shifted over to the right so as to rest upon core plate 82. It is then necessary to remove core plate 81 from over the drier plate 82. As previously described, if the core is deep or has high side walls, it is necessary to vertically raise the top core plate by manipulating the handle 95, but if the core is not deep then this manipulation of handle 95 is not necessary. The frame member 51 is then swung back upon its pivoted mounting to its original position, as shown in Figure 1, and the finished core is produced and resting upon the drier plate 82 on the frame member 52. The finished cores 100, having vents 101, are shown produced and resting upon the drier plate 82. At this point in the process the drier plate 82 is lifted off of the drier member 52 and carried to the oven or drying rack. The process is repeated with the use of another drier plate. Figure 10 shows a cross section through the core 100, and shows the core lying between the mating surfaces of the core plates 80 and 81.

In Figures 11 and 12 I illustrate another type of core, which is a one-way core. The one-way core 103 is formed in a core plate 104 and has a central opening 105 formed by a projecting portion on the core plate 104. In the core of this type there is only one cavity or recess in the core plate in which the core is formed. In the production of a core of this type the left hand frame member 50 may be disregarded and not used, and the core may be formed upon a core plate 104 mounted to the central frame member 51, and the opening in the core formed by the projection on the core plate extending within the depression. The transfer of the core to a drier plate is substantially the same as described above for the production of core 100.

Figures 13 and 14 illustrate the production of a two-way deep core having an upper portion 107 and a lower portion 108. The two-way deep core is formed between core plates 109 and 110, having the proper mating surfaces which meet to form one core therebetween. In a core of this type it is necessary to utilize the vertical lifting device attached to my frame members in order to raise core plate 109 from core plate 110 before pivotally swinging core plate 109 back into original position.

In Figures 15 and 16 I illustrate another type of core which is of the offset type, that is, having one portion disposed on a different plane from another portion. The upper core plate 116 has a recess 119 formed therein, and has a projection 120 also projecting therefrom. The lower core plate 117 has a recess 121 formed therein and also a projection 118 projecting therefrom. The projections and cavities are formed so as to form a cavity therebetween in which the core 113 is formed. The upper portion 115 of the core 113 is formed within one core plate, and the lower portion 114 of the core 113 is formed within the other core plate. It is noted that the meeting line of core plates 116 and 117 is a straight line, and the offset core 113 is formed by the proper mating surfaces of the core plates. This type of core illustrates another form of core which may be produced upon my core making machine.

There are several types of cores involving different methods and steps in their production which may be accurately and efficiently made upon my core making machine. The processes described in forming the illustrated cores have been by way of example, and it is readily seen that several processes may be followed in practicing the invention of my core making machine. It has been found that a large percentage of the waste caused by faulty cores has been done away with by the use of my machine, as perfectly formed cores are formed thereon and there is little, if any, chance of breakage. The pivoted bearings which produce accurate matings of the core plates are kept in true position by means of the guards over the pivoted mountings. Accurate production of cores, both deep and shallow, are possible by means of the manner in which the core plates are moved in respect to each other upon my machine. Proper alignment and positioning of the core plates is also facilitated by the bracing elements which hold the lower core plates at a proper level when pressure is applied thereto.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A machine for forming cores by molding core material between mating core plates comprising, in combination, a support member, a plurality of frame members, pivot means for pivotally mounting each said frame member to said support member, a second frame carried by each said frame member, adjustable means for adjustably fixing the position of the said second frame relative to the said frame member, and engaging means carried by each second frame and adapted to engage one of the said core plates, said engaging means being adjustable to permit movement of the said core plate toward and away from the said second frame and to hold the said core plate at a position away from the said second frame, the arrangement of the frame members and the support member being such that a first core plate engaged to the second frame carried by one of the frame members may be pivotally swung on said frame member into mating position with another core plate carried by the support member and may be removed from said mating position by consecutively operating said engaging means to move said first core plate away from the said another core plate and toward the second frame carried by said one frame member and by pivotally swinging said first core plate on said frame member back into non-mating position on said support member.

2. A machine for forming cores by molding core material between mating core plates comprising, in combination, a support member, a plurality of frame members, pivot means for pivotally mounting each said frame member to said support member, guard means carried by the support member for guarding the said pivot means from said core material, a second frame carried by each said frame member, adjustable means for adjustably fixing the position of the said second frame relative to the said frame member, guide means for holding the said second frame in alignment with said frame member, and engaging means carried by each second frame and adapted to engage one of the said core plates, said engaging means being adjustable to permit movement of the said core plate toward and away from the said second frame and to hold the said core plate at a position away from the said second frame, the arrangement of the frame members and the support member being such that a first core plate engaged to the second frame carried by one of the frame members may be pivotally swung on said frame member into mating position with another core plate carried by the support member and may be removed from said mating position by consecutively operating said engaging means to move said first core plate away from the said another core plate and toward the second frame carried by said one frame member and by pivotally swinging said first core plate on said frame member back into non-mating position on said support member.

3. A machine for forming cores by molding core material between mating core plates comprising, in combination, a support member, a plurality of frame members pivotally carried by the support member, each of said frame members being adapted to carry one of said core plates, connecting means carried by one of the frame members and adapted to connect the core plate carried by said one of the frame members, and operating means for actuating the connecting means to move said one core plate toward and away from said one frame member, the arrangement of the support member, frame members, and connecting means being such that said one core plate may be swung in an arc by said one frame member into mating position over another core plate carried by another frame member and may be raised up from the core formed between the core plates by operating said operating means to actuate the connecting means and may be successively swung back in said arc to its original position to clear said formed core.

4. In a book type core making machine for molding core material between mating core plates, said machine having a support member and a carrier member supported by the support member, said carrier member being adapted to carry one of said core plates from one position to an inverse position relative to another of said core plates, said support member and said carrier member having complementary leg members extending therefrom, one of said leg members having an open slot disposed therein and the other of said leg members having a pivot pin extending therefrom and adapted to selectively move out of, and to rotatively engage in, said open slot, a guard member having an arcuate shielding portion adapted to slidably fit over a portion of said one of the leg members to cover said open slot and having an arcuate supporting portion slidably engaged to a portion of said other of the leg members and adapted to revolve relative thereto, the arrangement of said shielding portion and said supporting portion being such that the carrier member may be moved to raise said pivot pin out of said open slot to disconnect said leg members and such that the carrier member may be revolved on said pivot pin in said open slot in a 180° arc relative to the support member to carry the core plate from one position to an inverse position and said open slot is protected from falling core material by the guard member revolubly sliding relative to said one of the leg members to cover the open slot in said other of the leg members throughout the movement in said 180° arc.

5. In a book type core making machine, a base, a carrier member supported by said base, said carrier member having a supporting portion carried thereby, and adjustable means for adjusting the position of said supporting portion relative to said carrier member, the said supporting portion being adapted to engage a core plate at a distance from the carrier member, the arrangement of the carrier member, supporting portion, and adjustable means being such that the position of the core plate engaged to said supporting portion relative to the carrier member is determinable by adjusting said adjustable means.

COLEMAN PREHODA.